3,047,379
PRODUCTION OF A COMPLEX FERTILIZER
John Kenneth Bradley and Thomas Pride Dee, Ipswich, and William Francis Sheldrick, Felixstowe, England, assignors to Fisons Limited, Suffolk, England
No Drawing. Filed Dec. 26, 1957, Ser. No. 705,093
Claims priority, application Great Britain Jan. 10, 1957
10 Claims. (Cl. 71—37)

The present invention relates to an improved process for the production of fertilizer materials.

Compound fertilizers contain two or more of the elements, nitrogen, phosphorus and potassium, which are required for plant life, and are produced in liquid or powder form, and more usually in granular form. Such compound fertilizers comprise for example, superphosphates, ammonium sulphate and potassium chloride, and are commonly prepared by mixing together materials containing the desired elements.

It has now been found that complex fertilizers may more conveniently be prepared by the reaction together of potassium chloride and nitric acid to produce a liquid product containing free nitric acid, removing the formed gaseous chlorine and nitrosyl chloride, and treating the product with phosphate rock.

Accordingly the present invention is for a process for the production of a complex fertilizer which comprises reacting together potassium chloride and nitric acid to produce a liquid product containing free nitric acid, removing the formed nitrosyl chloride and chlorine and treating the product with phosphate rock in particulate form.

It is preferred to carry out the process using excess nitric acid since inter alia this permits the substantially complete reaction of the potassium chloride, with the result that a substantially or completely chloride-free fertilizer may be obtained, and the chlorine may be recovered fully.

Accordingly the preferred embodiment of the present invention is for a process for the production of a complex fertilizer which comprises reacting together potassium chloride and nitric acid, the nitric acid being present in excess over the requirement of 4 mols of nitric acid per 3 mols of potassium chloride, removing the formed nitrosyl chloride and chlorine, and treating the product with phosphate rock in particulate form.

According to one embodiment of the present invention, the resulting product is thereafter treated with a neutralizing agent, preferably ammonia.

The use of excess nitric acid in the treatment of potassium chloride is of importance, since the presence of excess nitric acid accelerates very considerably the rate of reaction, and makes the process amenable to continuous operation. The nature of the excess of nitric acid may vary over a wide range and it has been found desirable to use at least 10%, and preferably 20-200% excess of nitric acid over the requirement of 4 mols of nitric acid per 3 mols of potassium chloride. It is found in general the use of nitric acid in amount greater than 100% excess has little effect in accelerating further the reaction rate. The proportion of nitric acid employed ultimately depends on the composition of the fertilizer material which it is desired to produce.

The potassium chloride employed may comprise any of the usually available salts and may be of high or low purity. This material may be used in the solid form, preferably finely divided, or as a solution, as is desired. The nitric acid employed should be of a concentration in the range 50-95% by weight and this nitric acid is preferably of a concentration of about 70%.

The phosphate rock employed in the present invention may be any of the phosphate rocks commonly employed such as for example the calcium phosphate type rock, which may be obtained for example from Morocco, Rhodesia, Florida and various Pacific Islands or the alumino phosphate type rock which may be obtained for example from Senegal. It is preferred to use a phosphate rock of the calcium phosphate type. The amount of phosphate rock which is employed in the process of the present invention is dependent ultimately on the N:P:K ratios in the fertilizer product which it is desired to produce. It is preferred to employ phosphate rock in amount comprising at least 40% by weight, and preferably 100-600% by weight, of the weight of the potassium chloride utilized in the process.

The neutralizing agent is preferably ammonia, inter alia, as this is the cheapest source of nitrogen, but may also comprise other materials such as potassium hydroxide, potassium carbonate and the like. Where ammonia is employed as the neutralizing agent this may comprise aqueous ammonia, for example of 25-33% concentration by weight or anhydrous ammonia.

The sulphuric acid which may be employed in the process of the present invention is suitably concentrated and preferably of a concentration in the range 50-100% by weight.

The reaction between the nitric acid and potassium chloride is preferably effected at an elevated temperature, suitably in excess of 80° C., and may be carried out at normal, reduced or super atmospheric pressure. It has been found most desirable to carry out the process at or about the boiling point of the reaction mixture, and when operating at normal pressures the use of temperatures in the range 100-120° C. is preferred.

At such temperatures the reaction between potassium chloride and nitric acid is rapid and proceeds according to the following equation:

$$3KCl + 4HNO_3 \rightarrow 3KNO_3 + NOCl + Cl_2 + 2H_2O$$

The formed nitrosyl chloride and chlorine are evolved from the liquid product and may be collected in any appropriate manner.

The liquid product obtained in accordance with the present invention is treated with particulate phosphate rock which is added in amount such as to react with the excess nitric acid present to the desired extent. If so desired sulphuric acid and/or phosphoric acid may be added to the reaction mixture as well as phosphate rock. These further acids may be added to the reaction mixture before or after the phosphate rock. The resulting acidic product is treated with a neutralizing agent to effect neutralization to the desired extent; vigorous agitation is most desirable during the neutralization process.

The amount of the neutralizing agent employed is dependent on the nature of the fertilizer product which it is desired to obtain.

The heat of reaction of neutralization is considerable and according to a preferred embodiment of the invention, this is used to assist in dehydrating the mixture. The fluid product may be evaporated to dryness to produce a powdered fertilizer; or to a semi-solid state which can be granulated as for example in a slurry granulator, or prilled in a prilling tower.

If desired the product may be admixed with other materials commonly incorporated into fertilizer products such as phosphates, superphosphates, potassium salts and ammonium salts or fillers, for example chalk, gypsum, brick dust and the like.

The process of the present invention may be used to prepare the products having a wide range of ratios $N:P_2O_5:K_2O$. The desired ratio may be obtained by the appropriate selection of proportions of the reactants employed.

The gases comprising nitrosyl chloride, obtained in the first stage of the process are suitably treated to recover the chlorine and decompose the nitrosyl chloride to oxides of nitrogen and chlorine, as for example by oxidation with nitric acid. The gas mixture containing chlorine is suitably fractionated to isolate the chlorine, which is removed as a by-product, and the nitrogen oxides, as such, or oxidised to nitric acid, are suitably recycled to the system. A preferred embodiment of the present invention is a cyclic process for the production of a complex fertilizer which comprises reacting together potassium chloride and nitric acid, the nitric acid being employed in amount in excess over the requirement of 4 mols of nitric acid per 3 mols of potassium chloride, removing the formed nitrosyl chloride and chlorine, treating the liquid product with phosphate rock, and treating the gases containing nitrosyl chloride and chlorine to decompose the nitrosyl chloride to nitrogen oxides and chlorine, isolating the chlorine and recycling the nitrogen oxides as such or as nitric acid to the first stage of the process.

The following examples are given to illustrate the process of the present invention:

Example 1

Muriate of potash (60% $K_2O$) and nitric acid of 65% concentration were fed to a continuously stirred reaction system at hourly rates of 790 pounds and 1450 pounds respectively. The reaction system was maintained at a temperature of 115–120° C. and nitrosyl chloride and chlorine were evolved. The gas mixture was submitted to a treatment by means of which it was converted to nitric acid and chlorine, the latter was taken off as a by-product and the former was returned continuously to the reaction system.

In the second stage of the process, the liquid product from the above reaction system containing nitric acid was mixed continuously with 852 pounds per hour of phosphate rock ex Morocco (33.3% $P_2O_5$; 50.3% CaO) and 544 pounds per hour of sulphuric acid containing 94% $H_2SO_4$ by weight.

In the third stage of the process the slurry from the second stage was treated with gaseous ammonia under conditions of vigorous agitation to give a pH value of 4.5, approximately 85 pounds of ammonia per hour being required.

The slurry from the third stage of the process was passed to a granulation plant in order to produce a granular product, this granular product amounting to 2820 pounds per hour, with an analysis of 10% N, 10% $P_2O_5$ and 16.6% $K_2O$. The phosphate content of the product was 97% water soluble according to the standard test.

Example 2

Muriate of potash (60% $K_2O$) and nitric acid of 65% concentration were fed to a continuously stirred reaction system at hourly rates of 790 pounds and 1450 pounds respectively. The reaction system was maintained at a temperature of 115–120° C. and nitrosyl chloride and chlorine were evolved. The gas mixture was submitted to a treatment by means of which it was converted to nitric acid and chlorine, the latter was taken off as a by-product and the former was returned continuously to the reaction system.

In the second stage of the process the liquid product from the first stage was mixed continuously with 1410 pounds per hour of phosphate rock ex Morocco (33.3% $P_2O_5$; 50.3% CaO) and 900 pounds per hour of sulphuric acid containing 94% $H_2SO_4$ by weight.

In the third stage of the process the slurry from the second stage was treated with gaseous ammonia under conditions of vigorous agitation to give a pH value of 4.5. The slurry from the third stage of the process was passed to a granulation plant in order to produce a granular product, this granular product amounting to 5,000 pounds per hour, with an analysis of 14.1% N; 9.4% $P_2O_5$; and 9.4% $K_2O$. The phosphate content of the product was 97% water soluble according to the standard test.

Example 3

Muriate of potash (60% $K_2O$) and nitric acid of 65% concentration were fed to a continuously stirred reaction system at hourly rates of 790 pounds and 2950 pounds respectively. The reaction system was maintained at a temperature of 115–120° C. and nitrosyl chloride and chlorine were evolved. Treatment of the gas mixture converted this to nitric acid and chlorine, of which the latter was taken off as a by-product while the former was returned continuously to the reaction system.

In the second stage there were added continuously, with good agitation, 400 pounds per hour of phosphate rock ex Florida (34.6% $P_2O_5$) and 870 pounds per hour of phosphoric acid of 38% concentration (expressed as $P_2O_5$).

In the third stage, with vigorous agitation, about 340 pounds per hour of gaseous ammonia was added. After granulating, drying and applying an anti-caking treatment, the product amounted to 3,790 pounds per hour with an analysis of 18.6% N; 12.4% $P_2O_5$; 12.4% $K_2O$. The phosphate content of the product was 98% water soluble according to the standard test.

Example 4

Muriate of potash (60% $K_2O$) and nitric acid of 65% concentration were fed to a continuously stirred reaction system at hourly rates of 790 pounds and 2950 pounds respectively. The reaction system was maintained at a temperature of 115–120° C., and nitrosyl chloride and chlorine were evolved. Treatment of the gas mixture converted this to nitric acid and chlorine, of which the latter was taken off as a by-product while the former was returned continuously to the reaction system.

In the second stage there was added continuously, with good agitation, 280 pounds of phosphate rock of the approximate formula: $3Ca_3(PO_4)_2.CaF_2$ and 500 pounds per hour of phosphoric acid of 38% concentration.

In the third stage gaseous ammonia was added with vigorous agitation to give a pH of 4.5.

The product obtained was granulated, the granular product amounting to 2,100 pounds per hour, with an analysis of 13.3% N; 13.3% $P_2O_5$; and 22.4% $K_2O$.

Example 5

Muriate of potash (60% $K_2O$) and nitric acid of 65% concentration were fed to a continuously stirred reaction system at hourly rates of 790 pounds and 1857 pounds respectively. The reaction system was maintained at a temperature of 115–120° C., and nitrosyl chloride and chlorine were evolved. The gas mixture was submitted to a treatment by means of which it was converted to nitric acid and chlorine, the latter was taken off as a by-product and the former was returned continuously to the reaction system.

In a second stage of the process the liquid product from the above reaction system, containing the excess nitric acid, was mixed continuously with 860 pounds per hour of phosphate rock ex Morocco (33.3% $P_2O_5$ content).

In the third stage the slurry from the second stage was treated with gaseous ammonia under conditions of vigorous agitation to give a pH value of 4.5, approximately 3.4 pounds of ammonia per hour being required.

The slurry from the third stage passed to a granulating plant, the granular product amounting to 2,403 pounds per hour, with an analysis of 11.1% N; 11.1% $P_2O_5$; 18.5% $K_2O$. The phosphate content of the product was 92% water-soluble according to the standard test.

Example 6

Muriate of potash (60% $K_2O$) and nitric acid of 65% concentration were fed to a continuously stirred reaction system at hourly rates of 790 pounds and 1857 pounds respectively. The reaction system was maintained at a temperature of 115–120° C., and nitrosyl chloride and chlorine were evolved. The gas mixture was submitted to a treatment by means of which it was converted to nitric acid and chlorine, the latter was taken off as a by-product and the former was returned continuously to the reaction system.

In a second stage of the process the liquid product from the above reaction system, containing the excess nitric acid, was mixed continuously with 860 pounds per hour of phosphate rock ex Morocco (33.3% $P_2O_5$ content).

In a third stage the slurry from the second stage was treated with a 50% by weight aqueous solution of potassium hydroxide to give a pH value of 4.5 under conditions of vigorous agitation. The thick slurry which was obtained was granulated.

We claim:

1. In a process for the production of a complex fertilizer, the steps of reacting together potassium chloride and nitric acid of a concentration in the range 50–95% by weight at a temperature in excess of 80° C., the acid being employed in an amount comprising 10 to 200% excess over the requirement of 4 mols of nitric acid per 3 mols of potassium chloride, thereby producing a liquid reaction product containing potassium nitrate, free nitric acid, nitrosyl chloride and chlorine, removing the nitrosyl chloride and chlorine from said liquid reaction product, admixing the resultant liquid nitric acid- and potassium nitrate-containing product with phosphate rock in particulate form and separating the resulting fertilizer product.

2. In a process for the production of a complex fertilizer, the steps of reacting together potassium chloride and nitric acid of a concentration in the range 50–95% by weight at about the boiling point of the reaction mixture, the acid being employed in an amount comprising 10 to 200% excess over the requirement of 4 mols of nitric acid per 3 mols of potassium chloride, thereby producing a liquid reaction product containing potassium nitrate, free nitric acid, nitrosyl chloride and chlorine, removing the nitrosyl chloride and chlorine from said liquid reaction product, admixing the resultant liquid nitric acid- and potassium nitrate-containing product with phosphate rock in particulate form and separating the resulting fertilizer product.

3. In a process as claimed in claim 2, the feature according to which the phosphate rock is a calcium phosphate type rock.

4. In a process for the production of a complex fertilizer, the steps of reacting together potassium chloride and nitric acid of a concentration in the range 50–95% by weight at about the boiling point of the reaction mixture, the acid being employed in an amount comprising 10 to 200% excess over the requirement of 4 mols of nitric acid per 3 mols of potassium chloride, thereby producing a liquid reaction product containing potassium nitrate, free nitric acid, nitrosyl chloride and chlorine, removing the nitrosyl chloride and chlorine from said liquid reaction product, admixing the resultant liquid acid- and potassium nitrate-containing product with phosphate rock in particulate form, treating the so-obtained mixture with a neutralizing agent selected from the group consisting of ammonia and potassium hydroxide and separating the resulting fertilizer product.

5. In a process as claimed in claim 4, the feature according to which the treatment with the neutralizing agent is carried out with vigorous agitation.

6. In a process as claimed in claim 4, the feature according to which the heat of reaction of the treatment with the neutralizing agent assists in the dehydration of the resulting product.

7. A process for the production of a complex fertilizer, which comprises reacting together potassium chloride and nitric acid of a concentration in the range 50–95% by weight at a temperature of the order to 100° C., the nitric acid being employed in an amount comprising 10 to 200% excess over the requirement of 4 mols of nitric acid per 3 mols of potassium chloride, thereby producing a liquid reaction product containing potassium nitrate, free nitric acid, nitrosyl chloride and chlorine, removing the nitrosyl chloride and chlorine from said liquid reaction product, admixing the resulting liquid nitric acid- and potassium nitrate-containing product with calcium phosphate rock in particulate form, treating the resultant admixture with ammonia with vigorous agitation, thereafter drying the so-obtained product to yield a solid fertilizer.

8. In a cyclic process for the production of a complex fertilizer, the steps of reacting together potassium chloride and nitric acid of a concentration in the range 50–95% by weight at about the boiling point of the reaction mixture, the acid being employed in an amount comprising 10 to 200% excess over the requirement of 4 mols of nitric acid per 3 mols of potassium chloride, thereby producing a liquid reaction product containing potassium nitrate, free nitric acid, nitrosyl chloride and chlorine, removing the nitrosyl chloride and chlorine as a gaseous mixture from said liquid reaction product, admixing the resultant liquid nitric acid- and potassium nitrate-containing product with phosphate rock, separating the resulting fertilizer product, oxidizing the gases containing nitrosyl chloride and chlorine and thus converting the nitrosyl chloride to nitrogen oxides and chlorine, isolating the chlorine and recycling the nitrogen oxides to the first stage of the process.

9. In a cyclic process as claimed in claim 8, the feature according to which wherein the nitrogen oxides are oxidized to nitric acid prior to recycling to the first stage of the process.

10. A cyclic process for the production of a complex fertilizer, which comprises reacting together potassium chloride and nitric acid of a concentration in the range 50–95% by weight at about the boiling point of the reaction mixture, the nitric acid being employed in an amount comprising 10 to 200% excess over the requirement of 4 mols of nitric acid per 3 mols of potassium chloride, thereby producing a liquid reaction product containing potassium nitrate, free nitric acid, nitrosyl chloride and chlorine, removing the nitrosyl chloride and chlorine from said liquid reaction product, admixing the resulting liquid nitric acid- and potassium nitrate-containing product with phosphate rock, treating the resulting admixture with ammonia with vigorous agitation, thereafter drying the so-obtained product to obtain a solid fertilizer and removing the latter from the reactant system, oxidizing the removed nitrosyl chloride-chlorine mixture and thus converting the nitrosyl chloride to nitrogen oxides and chlorine, oxidizing the nitrogen oxides to nitric acid and recycling the formed nitric acid to the first stage of the process.

References Cited in the file of this patent

UNITED STATES PATENTS

| 1,970,372 | Gelhaar | Aug. 14, 1934 |
| 2,170,843 | Turrentine | Aug. 29, 1939 |
| 2,208,112 | Beekhuis | July 16, 1940 |

FOREIGN PATENTS

| 562,634 | Germany | Mar. 15, 1930 |